United States Patent [19]

Morris

[11] Patent Number: 4,643,450

[45] Date of Patent: Feb. 17, 1987

[54] READING SYSTEM

[76] Inventor: Max F. Morris, P.O. Box 457, Windermer, Fla. 32786

[21] Appl. No.: 796,693

[22] Filed: Nov. 12, 1985

[51] Int. Cl.⁴ .................. G09B 17/02; G09B 17/04; B42F 21/08
[52] U.S. Cl. ............................ 283/46; 283/40; 434/178
[58] Field of Search .............. 283/36, 39, 40, 45, 283/46; 434/167, 178, 179, 180, 181, 182, 183; 101/39

[56] References Cited

U.S. PATENT DOCUMENTS

| | | | |
|---|---|---|---|
| 629,214 | 7/1899 | Simpson | 283/40 |
| 1,456,834 | 5/1923 | Sheffield | 434/167 |
| 3,611,593 | 10/1971 | Shapiro | 434/178 |
| 3,744,155 | 7/1973 | de Monet | 283/46 |
| 4,270,284 | 6/1981 | Skellings | 283/46 |

FOREIGN PATENT DOCUMENTS 1261901  1/1972  United Kingdom .............. 434/167

OTHER PUBLICATIONS

U.S. Patent Office Classification Manual, 1961 Series.

*Primary Examiner*—Paul A. Bell
*Assistant Examiner*—Paul M. Heyrana, Sr.
*Attorney, Agent, or Firm*—William M. Hobby, III

[57] ABSTRACT

A reading system and method of printing reading material for faster reading are provided in which a plurality of printed sheets are provided with each having at least one vertically extending scan bar. A plurality of short printed lines of indicia are printed perpindicular to the scan bar, with certain lines having scan words therein in a bolder or different colored type font. A plurality of scan line indicators are placed adjacent to the scan bar adjacent each scan line having scan words. A method of printing sheet material for fast reading includes selecting the paper for printing and arranging material to be printed in short lines of indicia having selected scanned words in selected lines in a bolder or different colored font adjacent a vertical scan bar, then placing scan line indication marks adjacent to the vertical scan bar and adjacent each line of font having scanned words therein. Then printing the selected paper with the prearranged printed material thereon.

3 Claims, 1 Drawing Figure

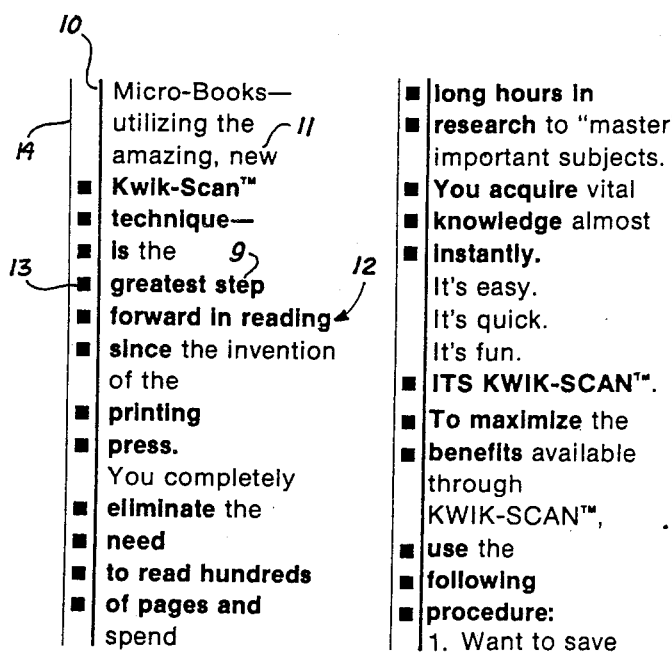

*14*   Micro-Books—
utilizing the *11*
amazing, new
- Kwik-Scan™
- technique—
- is the   *9*
*13* — ■ greatest step   *12*
- forward in reading
- since the invention
of the
- printing
- press.
You completely
- eliminate the
- need
- to read hundreds
- of pages and
spend

- long hours in
- research to "master"
important subjects.
- You acquire vital
- knowledge almost
- instantly.
It's easy.
It's quick.
It's fun.
- ITS KWIK-SCAN™.
- To maximize the
- benefits available
through
KWIK-SCAN™,
- use the
- following
- procedure:
1. Want to save

READING SYSTEM

BACKGROUND OF THE INVENTION

The present invention relates to a reading system and process for printing and reading texts, and especially to a system using scan bars, scan words and scan indicators.

There are a wide variety of techniques used for teaching speed reading and to enable readers to speed up the reading to cover more material in less time while enhancing the retention of the material read. The closest prior art to the present invention are those techniques particularly directed to guiding the movement of the readers eye from one line or line group of printed material, or the like, to the next succeeding line or line group. It has also been suggested that proper technique for studying includes underlining text material, or reading in phrases rather than by individual words so that articles and certain types of words can be ignored. Thus, the format of the reading, such as a page or column, needs to have relatively short lines and relatively wide spaces from each other to avoid the difficulty of skipping material.

The present invention is directed towards a printing technique in which books, pamphlets, papers or flyers can be produced for the rapid reading in which a variety of techniques are integrated into a single reading columns located on each page. These techniques enhance the ability of the individual to rapidly scan and comprehend the material by keeping the reader's eye aligned with the scan bar while selecting words to be scanned which are printed in a bold or different colored type and having scanned line indicator marks for directing the eye towards the scanned material. Experimentations have shown that anyone with minimal practice can substantially increase their speed of reading and material covered using the present system.

Prior art U.S. Patents which utilize techniques for scanning, reading or using a phonic alphabet may be seen in the Shapiro U.S. Pat. No. 3,611,593, for a line-group sequential reading aid, in which selected lines have a visible symbol adjacent thereto. This system aids the eye of the reader in following the sequence of lines to be read by providing marginal indicia at the start of each line or line group to guide the reader's eye to the start of the next succeeding line group to be read and to tie in the starting indicia with like indicia at the end of the proceeding line group. U.S. Pat. No. 3,426,451 to Hoffman, shows a phonic alphabet in which a font of alphabetical letters is used for teaching spelling and reading. The U.S. Patent to Sheffield, U.S. Pat. No. 1,456,834, shows an art of printing, which uses a variety of type fonts and styles, all intermixed within each paragraph so that each group of elements are separated throughout the printed material. In U.S. Pat. No. 875.756 to Warren, a stenographer's note book is shown with vertical and horizontal lines.

SUMMARY OF THE INVENTION

The present invention includes a reading system which has a plurality of printed sheets, each sheet having at least one vertically extending scan bar and printed lines of indicia, printed perpendicular to the scan bar and selective lines having scanned words therein in a bold or different colored type font. A plurality of scan line indicators are placed adjacent to the scan bar, adjacent those lines having scan words indicative of lines having scan words. The scan line indicators can be square dots if desired and shorter phrase length lines are used for the scan lines. The method of printing the reading material for faster reading includes the steps of selecting the paper stock for printing upon, then arranging the material to be printed on the paper stock in short lines having selected scan words in a bolder or different colored type font and, aligning these lines adjacent the vertical scan bar, then placing the scan line indicator marks adjacent the vertical scan bar and adjacent each line of type having bolder scan words therein. The next step is printing the selected paper with the prearranged printed material thereon whereby the printed sheet can be read faster.

BRIEF DESCRIPTION OF THE DRAWING

Other objects, features and advantages of the present invention will be apparent from the written description and the drawing in which the drawing is a sample of printed text in accordance with the present invention.

DESCRIPTION OF THE PREFERRED EMBODIMENTS

Referring to the drawing, a sample of reading text using the present reading system and process is illustrated in which each page has at least one scan bar 10 running vertical on the page of material and having short lines or phrases of font printed scan line 11 perpendicular to the scan bar 10 running down the page of the right side of the scan bar 10. Scanned indicia is shown in a standard font printed scan line 11 but also in a bold font printed scan line 12 which may also be of a different color than the font printed scan line 11. Each scan line 11 has scan words 9 in a bolder print and in a different color may have a scan indicator 13 placed on the other side of the scan bar 10 from the scan lines but adjacent any scan line having scan words therein. The text material as shown in the figure may also have a second lighter scan bar 14 running parallel to the scan bar 10 on the other side of the scan indicators 13. The line 14 is a lighter line than line 10. The text material may have headings which would normally be scan lines and which would be printed in a bold print. The headlines would be a larger type as normally found in headings.

To read the material shown in the figure, a reader learns to read each entire line rather then the individual words. The lines are made of a length that can be easily read a phrase at a time as one scans from the top of a column to the bottom without shifting the eyes from one side to the other. The scan indicators 10 focus the eye on each scan line having scan words which may also be made to stand out by the use of a different color. Thus, when reading, the eye follows the scan bar 10 from top to bottom reading each phrase as one skips from one scan indicator line 13 and scan words 9 to the next. The scan words 9 are automatically emphasized so that study aids such as underlining are not necessary and the fast reading allows a quick scan at a much greater rate of reading and comprehension. The system, advantageously, takes only minimal learning to substantially increase the speed of reading the material so that a person is able to cover large amounts of material in a much shorter period of time.

A process or method of printing the reading material as shown in the figure includes the step of selecting the paper stock in which to print the material upon of a size for taking the desired number of columns. The next step is arranging the material to be printed with the short lines of indicia as shown in font printed scan lines 11 and 12, having selected scan words 9 in a bolder type font or in a different color from the non-scan words. Each short line is set up in a phrase length adjacent to the vertical scan bar 10. The next step is placing scan line indicator marks 13, which are illustrated as squares in a different color, adjacent to font printed scan bar 10 and adjacent to scan lines 12 which have scan words 9 in the line. The first step is printing the selected paper with the prearranged material thereon so that the printed sheet can be read faster.

It should be clear that the present invention is directed towards a printing system in which books, pamphelts, papers or flyers can be produced for rapid reading in a variety of techniques integrated into single reading columns located on each page. These techniques enhance the ability to rapidly scan and comprehend the material by keeping the readers eye aligned with the scan bar 10 while selecting words 9 to be scanned which are printed in a bold or different color type and having scan line indicator marks 13 for directing the eye towards the scan material. However, it should be clear that the present invention is not to be considered limited to the form shown which is to be considered illustrative rather then restrictive.

I claim:
1. A speed reading system comprising:
   a plurality of printed sheets, each sheet having at least one vertically extending scan bar;
   a plurality of printed lines of indicia extending perpendicular to the scan bar, and selected printed lines of indicia having scan words therein in a bolder type font;
   a plurality of scan line indicators located adjacent to the scan bar, and one scan line indicator being adjacent each scan line having scan words in bold type font therein, each said scan line indicator being indicative of lines having scan words therein, and
   a second scan bar being placed parallel to the first scan bar on the other side of the scan line indicators.
2. A reading system in accordance with claim 1 in which each scan line indicator is a solid color square.
3. A reading system in accordance with claim 2 in which each scan word in bold type font is in one color and the remaining indicia is in another color and each scan line indicator is in the same color as the scan words in bold type font.

* * * * *